US007746903B2

(12) United States Patent
Klish, II

(10) Patent No.: US 7,746,903 B2
(45) Date of Patent: Jun. 29, 2010

(54) SONET MANAGEMENT AND CONTROL CHANNEL IMPROVEMENT

(75) Inventor: Cypryan Theodore Klish, II, Melbourne, FL (US)

(73) Assignee: Harris Corporation, Melbourne, FL (US)

(*) Notice: Subject to any disclaimer, the term of this patent is extended or adjusted under 35 U.S.C. 154(b) by 712 days.

(21) Appl. No.: 11/370,959

(22) Filed: Mar. 7, 2006

(65) Prior Publication Data

US 2007/0211761 A1 Sep. 13, 2007

(51) Int. Cl.
*H04J 3/18* (2006.01)
*H04B 7/212* (2006.01)

(52) U.S. Cl. .......................... 370/477; 370/442; 398/58

(58) Field of Classification Search .............. 370/389, 370/395, 437, 395.5, 230, 237, 254, 216, 370/221–228, 248, 371–374, 392, 395.51, 370/406, 442, 412, 428, 465–468, 476, 477, 370/527–529, 539; 398/68, 75, 2, 4, 58, 398/98, 102, 147; 709/200, 203, 217, 223–225, 709/251

See application file for complete search history.

(56) References Cited

U.S. PATENT DOCUMENTS

| 4,893,306 | A | | 1/1990 | Chao et al. | |
|---|---|---|---|---|---|
| 5,267,236 | A | | 11/1993 | Stephenson, Jr. | |
| 5,544,172 | A | | 8/1996 | Abbas | |
| 6,009,076 | A | | 12/1999 | Takatsu et al. | |
| 6,014,708 | A | * | 1/2000 | Klish | 709/232 |
| 6,654,802 | B1 | * | 11/2003 | Oliva et al. | 709/224 |
| 6,697,386 | B2 | * | 2/2004 | Sugawara et al. | 370/535 |
| 6,816,509 | B2 | * | 11/2004 | Pelley et al. | 370/466 |
| 6,856,620 | B1 | * | 2/2005 | Dunsmore et al. | 370/389 |
| 6,895,018 | B1 | | 5/2005 | Klish, II | |
| 6,993,046 | B1 | | 1/2006 | Hernandez-Valencia et al. | |
| 6,993,047 | B1 | | 1/2006 | Nigam et al. | |
| 7,002,986 | B1 | | 2/2006 | Roberts | |
| 7,075,952 | B1 | | 7/2006 | Torma et al. | |

(Continued)

FOREIGN PATENT DOCUMENTS

EP 0468818 A2 1/1992

(Continued)

OTHER PUBLICATIONS

Akcay, A.R., "Some Proposals for New Transport Technology in Bisdn" Proceedings of the Bilkent International Conference of New Trends on Communication, Control and Signal Processing, Amsterdam, NL. vol. 1, Jul. 2, 1990, pp. 1-7.

(Continued)

*Primary Examiner*—Aung S Moe
*Assistant Examiner*—Prince Mensah
(74) *Attorney, Agent, or Firm*—Fox Rothschild, LLP; Robert J. Sacco

(57) ABSTRACT

Method of using existing SONET transport overhead bytes (202) to provide additional bandwidth for increased management traffic, without the need to make use of SONET payload capacity (204). Overhead bytes that are undefined by the SONET Telecommunication Standard for certain STS-1 frames (200) of an STS-n frame (500) are used to form data channels. Using the undefined bytes, data can be communicated between a plurality of nodes (402, 404, 406) in the network.

17 Claims, 8 Drawing Sheets

U.S. PATENT DOCUMENTS

| | | | |
|---|---|---|---|
| 7,103,044 B1* | 9/2006 | Keller et al. | 370/392 |
| 7,158,721 B2 | 1/2007 | Mantin et al. | |
| 7,161,961 B2 | 1/2007 | Barker et al. | |
| 2001/0021171 A1* | 9/2001 | Notani | 370/222 |
| 2001/0039580 A1* | 11/2001 | Walker et al. | 709/224 |
| 2002/0059408 A1* | 5/2002 | Pattabhiraman et al. | 709/223 |
| 2003/0152114 A1 | 8/2003 | Sandstrom | |
| 2005/0122899 A1* | 6/2005 | DeBoer et al. | 370/222 |
| 2005/0190758 A1* | 9/2005 | Gai et al. | 370/389 |

FOREIGN PATENT DOCUMENTS

| | | |
|---|---|---|
| JP | 2005080037 A | 3/2005 |
| WO | WO-00 60815 | 10/2000 |
| WO | WO-02 054640 | 7/2002 |

OTHER PUBLICATIONS

Takase, et al., "Broadband Subscriber Loop Systems" Hitachi Review, Hitachi Ltd. Tokyo, JP, vol. 40, No. 3, Jun. 1, 1991, pp. 199-204.

"Digital Hierarchy—Optical Interface Rates and Formats Specifications" American National Standard, vol. TI. 105-1988, 1988, the whole document.

* cited by examiner

Undefined Overhead Byte Summary

| Row | Col | Defined Use | Undefined for |
|---|---|---|---|
| 1 | 1,2 | Framing A1, A2, all STSs of an STS-N | None |
| 1 | 3 | Section Trace, J0, Section Growth Z0, All STSs of anSTS-N | None |
| 2 | 1 | Section BIP-8, B1, STS-1 #1 of an STS-N only | STS-1 #2 to STS-1 N |
| 2 | 2 | Orderwire, E1, STS1 #1 of an STS-N only | STS-1 #2 to STS-1 N |
| 2 | 3 | Section User Channel, F1, STS1 #1 of an STS-N only | STS-1 #2 to STS-1 N |
| 3 | 1-3 | Section Data Communications Channel, D1-3, STS1 #1 of an STS-N only | STS-1 #2 to STS-1 N |
| 4 | 1-3 | Pointer, Pointer Action, H1-3, all STSs of an STS-N | None |
| 5 | 1 | Line BIP-8, B2, STS-1 #1 of an STS-N only | STS-1 #2 to STS-1 N |
| 5 | 2,3 | APS Channel, K1-2 | STS-1 #2 to STS-1 N |
| 6,7,8 | 1-3 | Line Data Communications Channel, D4-12, STS1 #1 of an STS-N only | STS-1 #2 to STS-1 N |
| 9 | 1 | Synchronization Messaging, S1, Growth Z, STS-1s 1-48 of an STS-N | STS-1 #49 to STS-1 N |
| 9 | 2 | Growth, Z2 or REI, M0/M1, STS-1s 1-48 of an STS-N | STS-1 #49 to STS-1 N |
| 9 | 3 | Orderwire, E1, STS1 #1 of an STS-N only | STS-1 #2 to STS-1 N |

Fig. 6

| A1 Framing | A1 Framing | A1 Framing | A2 Framing | A2 Framing | A2 Framing | J0 Trace | Z0 Growth | Z0 Growth |
|---|---|---|---|---|---|---|---|---|
| B1 BIP-8 | Media Depend. | Media Depend. | E1 Orderwire | Media Depend. | Undefined | F1 User | National Use | National Use |
| D1 Data Com | Media Depend. | Media Depend. | D2 Data Com | Media Depend. | Undefined | D3 Data Com | Undefined | Undefined |
| H1 Pointer | H1 Pointer | H1 Pointer | H2 Pointer | H2 Pointer | H2 Pointer | H3 Ptr Action | H3 Ptr Action | H3 Ptr Action |
| B2 BIP-8 | B2 BIP-8 | B2 BIP-8 | K1 APS | Undefined | Undefined | K2 APS | Undefined | Undefined |
| D4 Data Com | Undefined | Undefined | D5 Data Com | Undefined | Undefined | D6 Data Com | Undefined | Undefined |
| D7 Data Com | Undefined | Undefined | D8 Data Com | Undefined | Undefined | D9 Data Com | Undefined | Undefined |
| D10 Data Com | Undefined | Undefined | D11 Data Com | Undefined | Undefined | D12 Data Com | Undefined | Undefined |
| S1 Sync | Growth Z1 | Growth Z1 | Growth Z2 | Growth Z2 | M1 REI | E2 Orderwire | National Use | National Use |

Undefined Transport Overhead Byte Locations in an STS-3 Frame

Fig. 7

Undefined Transport Overhead Byte Locations in an STS-1 # 4, 5, and 6 of an STS-N Frame (n>3)

| A1 Framing | A1 Framing | A1 Framing | A2 Framing | A2 Framing | A2 Framing | Z0 Growth | Z0 Growth | Z0 Growth |
|---|---|---|---|---|---|---|---|---|
| Undefined | Undefined | Undefined | Undefined | Undefined | Undefined | Undefined | Undefined | Undefined |
| D1 Data Com | Undefined | Undefined | D2 Data Com | Undefined | Undefined | D3 Data Com | Undefined | Undefined |
| H1 Pointer | H1 Pointer | H1 Pointer | H2 Pointer | H2 Pointer | H2 Pointer | H3 Ptr Action | H3 Ptr Action | H3 Ptr Action |
| Undefined | Undefined | Undefined | K1 APS | Undefined | Undefined | K2 APS | Undefined | Undefined |
| D4 Data Com | Undefined | Undefined | D5 Data Com | Undefined | Undefined | D6 Data Com | Undefined | Undefined |
| D7 Data Com | Undefined | Undefined | D8 Data Com | Undefined | Undefined | D9 Data Com | Undefined | Undefined |
| D10 Data Com | Undefined | Undefined | D11 Data Com | Undefined | Undefined | D12 Data Com | Undefined | Undefined |
| S1 Sync | Growth Z1 | Growth Z1 | Growth Z2 | Growth Z2 | M1 REI | E2 Orderwire | Undefined | Undefined |

9 Bytes

9 Rows

Fig. 8

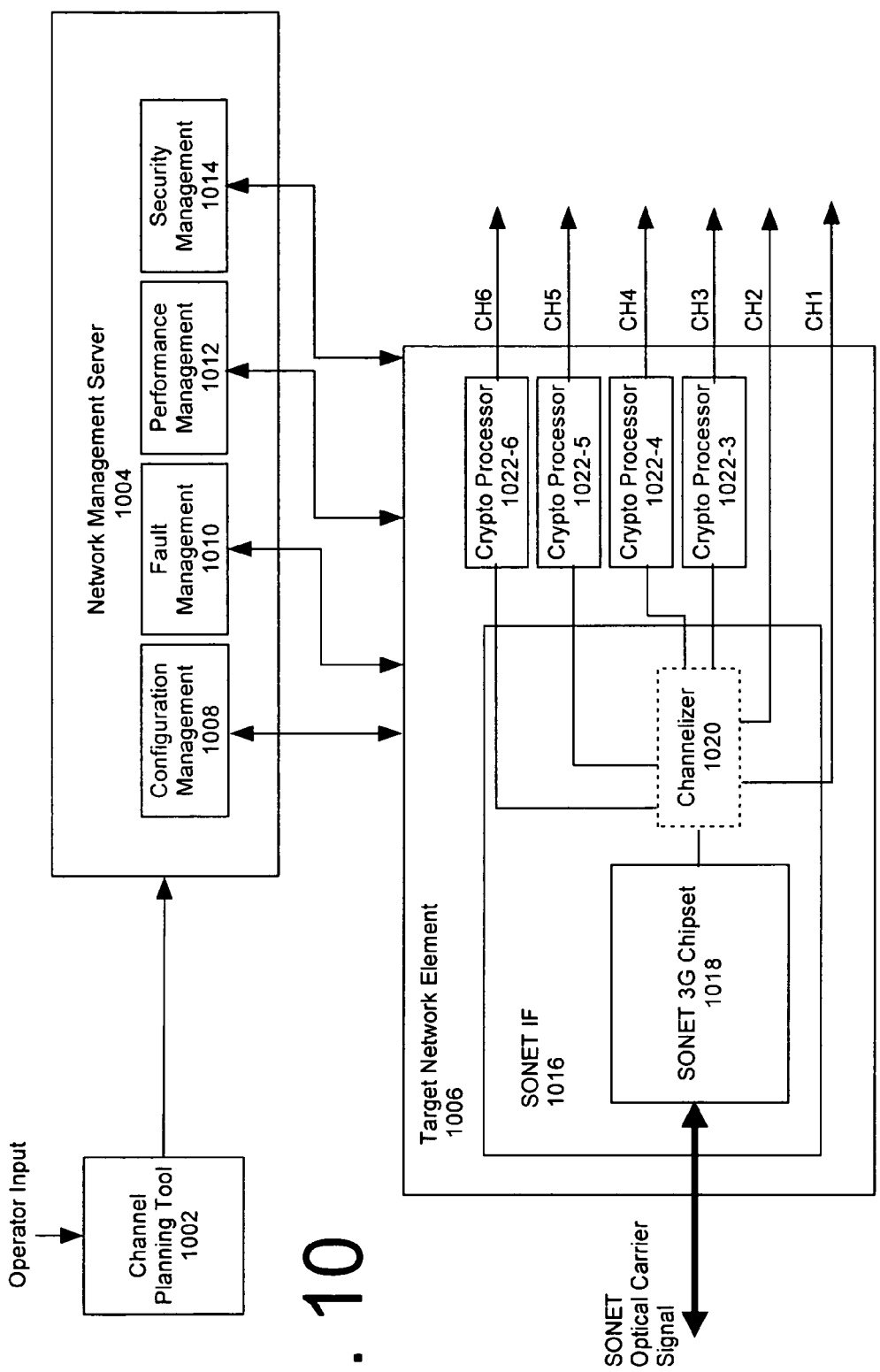

SONET MANAGEMENT AND CONTROL CHANNEL IMPROVEMENT

BACKGROUND OF THE INVENTION

1. Statement of the Technical Field

The inventive arrangements relate generally to the transmission of data in a synchronous optical network, and more particularly to a method for improved utilization of certain undefined overhead data bytes in an otherwise defined data frame.

2. Description of the Related Art

The SONET (Synchronous Optical Network) telecommunications standard defines a set of signals for optical telecommunications data transport. The SONET standard provides a number of Data Communication Channels (DCCs) each having a different capacity for carrying management data across the network. This is accomplished by defining a base level signal having a lowest data carrying capacity, and using a byte-interleaved multiplexing scheme to generate higher level signals with larger data carrying capacity. In the SONET standard, the base level signal is generally referred to as the Synchronous Transport Signal level-1 (STS-1). Higher level signals are integer multiples of this base level signal and are generally referred to as STS-N signals. The byte-interleaved multiplexing scheme defined by the SONET standard provides that each STS-N signal is composed of N STS-1 signals that have been interleaved together to form the higher level transport signal.

Each STS-1 frame is divided into two main areas. These include a transport overhead area and a synchronous payload envelope (SPE) area for the transmission of payload data. The transport overhead area as defined by the SONET standard includes a number of Data Communication Channel (DCC) bytes that are used to form message channels for transporting management traffic. For example, the section DCC channel bytes can be used for operations, administration, and maintenance of section-terminating equipment. Similarly, line DCC bytes are used to form a message channel for control, monitoring, and administration of line-terminating equipment.

Notably, the existing SONET DCC channels are insufficient for transporting the volume of management traffic needed by net-centric, highly secure, converged networks. The capacities of existing defined SONET Data Communications Channels (DCC) are simply insufficient. For example the capacity of the section DCC is only 192 Kbps. Similarly, the capacity of line DCC is only 576 Kbps. The alternative to DCC is to transport management traffic in the SPE area that comprises the SONET payload. However, this robs payload bandwidth and decreases end-user data throughput. These are significant disadvantages where network centricity is increasing the demand for greater throughput of end-user data.

SUMMARY OF THE INVENTION

The invention concerns a method of using existing SONET transport overhead bytes in a way that provides additional bandwidth for increased management traffic, without the need to make use of payload capacity. The invention accomplishes this result by utilizing overhead bytes that are undefined in certain circumstances.

In a SONET based system, a set of synchronous transport signals (STSs), are defined. At a base signal level referred to as STS-1, each frame is divided into two main areas. These include a transport overhead area and a synchronous payload envelope (SPE) area for the transmission of data. The transport overhead area is divided into a section overhead area and a line overhead area. Notably, many of the bytes in the section overhead area and the line overhead area are only defined for the first STS-1 in a frame of an STS-n signal. Accordingly, these bytes are can be selectively used to form additional transport channels that can be used for network management and for other purposes. In this regard, the method can include selecting from the transport overhead area, at least one byte that is undefined by the SONET Telecommunication Standard. Using this undefined byte or bytes, data can be communicated between a plurality of nodes in the network using at least one data channel formed of the at least one byte that is undefined. Notably, undefined bytes for this purpose can be selected from the section overhead area or from the line overhead area.

The method can also include dynamically selecting the byte or bytes from the transport overhead area to form a dynamically configurable data channel. For example, the dynamically selection can include dynamically modifying one or more data channel characteristics. These characteristics can include the location of the channel byte or bytes that are used to form the channel within the transport overhead area. The channel characteristic that is dynamically modified can also include the bandwidth of the data channel. For example, more or fewer undefined bytes can be used for the data channel as needed. The channel can also be dynamically formed and dynamically deconstructed as the need for such a traffic channel arises in the course of network operations.

Data that is communicated over the data channel data formed from the undefined bytes can be selected so that is exclusively of a single data type. For example, the data type can be network management data, or network control and signaling data. Advantageously, one or more data channels can be formed using the present invention. Further, the method can include communicating data having a first defined security level on a first one of the data channels, and communicating data having a second defined security level on at least a second one of the data channels. The first and second defined security levels can be different from one another. For example, one security level can be a Classified security level, a second defined security level can be a Secret level and a third defined security level can be a Top Secret level. In this regard, it can also be advantageous to encrypt one or more of the data channels thus formed. For example, each channel can be separately encrypted so as to meet the differing encryption requirements of the multiple security levels.

The method can also include monitoring the status of the network to identify when changes to the quantity or capacity of the one or more data channels is needed. For example, in response to the monitoring step, the quantity or capacity of the one or more data channels can be automatically modified.

BRIEF DESCRIPTION OF THE DRAWINGS

FIG. 6 is a table that identifies undefined overhead bytes in the transport overhead portion of a SONET frame.

FIG. 7 is a diagram that is useful for identifying those bytes in an STS-3 frame that are undefined.

FIG. 8 is a diagram that is useful for identifying those bytes in an STS-N frame that are undefined.

FIG. 10 is a block diagram that is useful for understanding the flowchart in FIG. 9.

DETAILED DESCRIPTION OF THE PREFERRED EMBODIMENTS

In a SONET based system, a set of synchronous transport signals (STSs), are defined, with a base transmission rate referred to as STS-1. Faster rate signals are defined at integer multiples of the base transmission rate. The various higher level signals and their corresponding rates as defined by the SONET specification are set forth in FIG. 1.

Figures 1, 2:
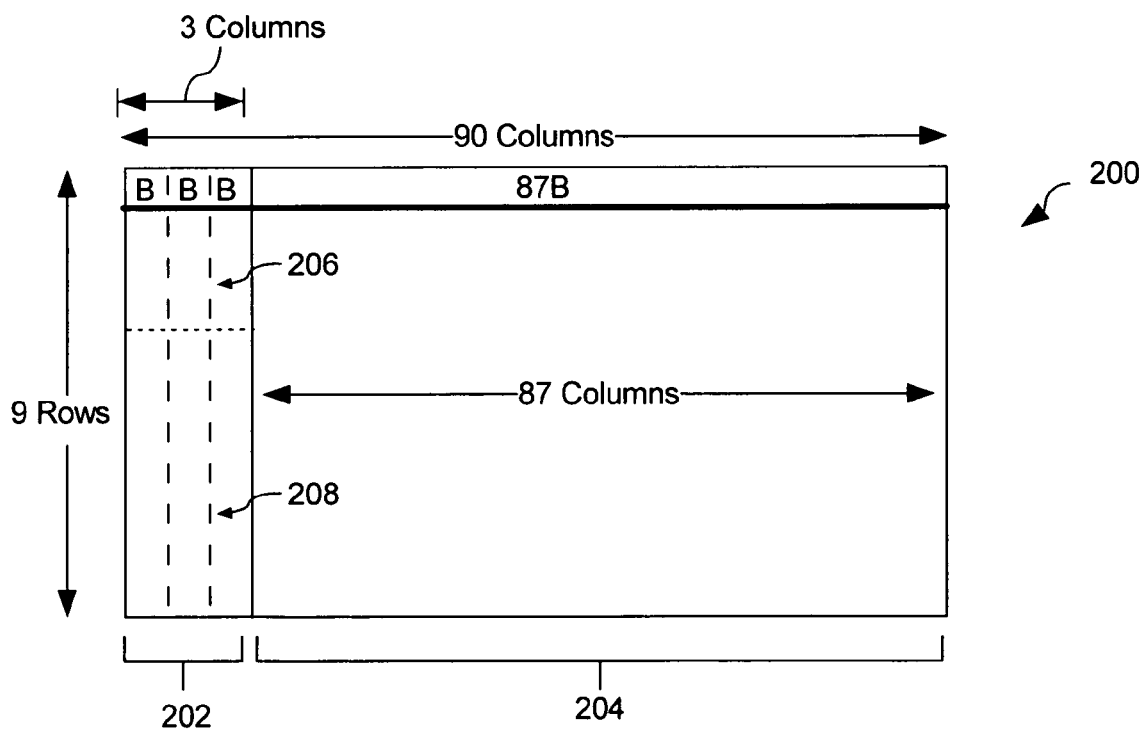
FIG. 1 is a table that is useful for understanding the SONET hierarchy.
FIG. 2 is a diagram that is useful for understanding an STS-1 frame format.
Figure 3:
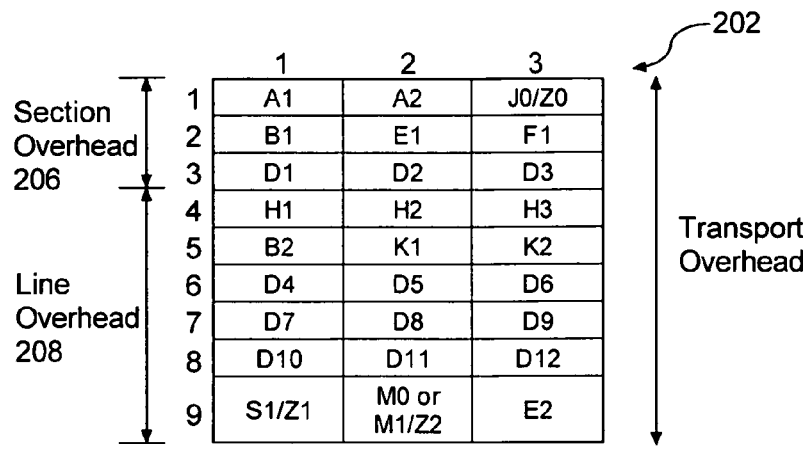
FIG. 3 is a diagram that is useful for understanding a structure of the transport overhead portion of a SONET frame.

Referring now to FIG. 2, there is provided a drawing that is useful for understanding the format of an STS-1 frame 200. Each STS-1 frame is divided into two main areas. These include a transport overhead area 202 and a synchronous payload envelope (SPE) area 204. The transport overhead area is divided into a section overhead area 206 and a line overhead area 208. As currently defined by the SONET specification, the transport overhead area is utilized for network management functions. For example, these can include monitoring, control and other administrative needs. FIG. 3 shows a more detailed view of the transport overhead area 202, including the designation for the individual bytes contained in both the section overhead area 206 and the line overhead area 208.

Figure 4:
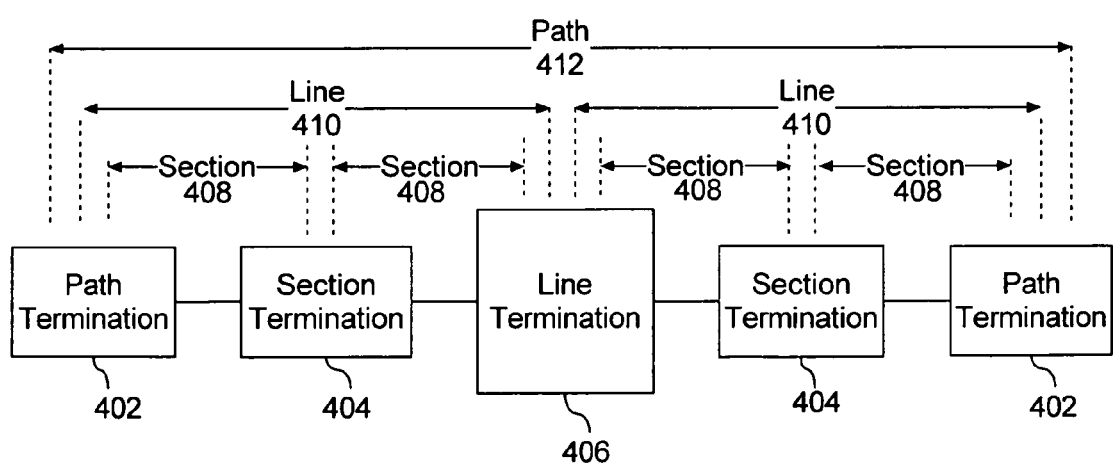
FIG. 4 is a diagram that is useful for understanding the various overhead layers that exist in a SONET based network.

In order to better understand the purpose of the transport overhead area 202, it is useful to refer to FIG. 4. It can be observed in FIG. 4 that there are several overhead information layers that are defined in SONET. Section level overhead layer 408 is used for communication between adjacent terminating equipment at the section level. For example, this overhead layer can be used for communication of monitoring, control, and administrative data. The section overhead area 206 of the STS-1 frame is used for such data communications between terminating equipment at the section level. For example, in FIG. 4, the section level information is used between section terminators 404 and path terminators 402. The section level overhead layer 408 could also be used between adjacent regenerators.

The line level overhead layer 406 is used for communication between adjacent terminating equipment at the line level. For example, this overhead layer can be used for communication of monitoring, control, and administrative data. The line overhead area 208 of the STS-1 frame 200 is used for such line level overhead layer communications between terminating equipment at the line level. For example, in FIG. 4, the line level overhead layer 406 can be used for communicating network management information between line termination 406 and path terminators 402.

Figure 5:
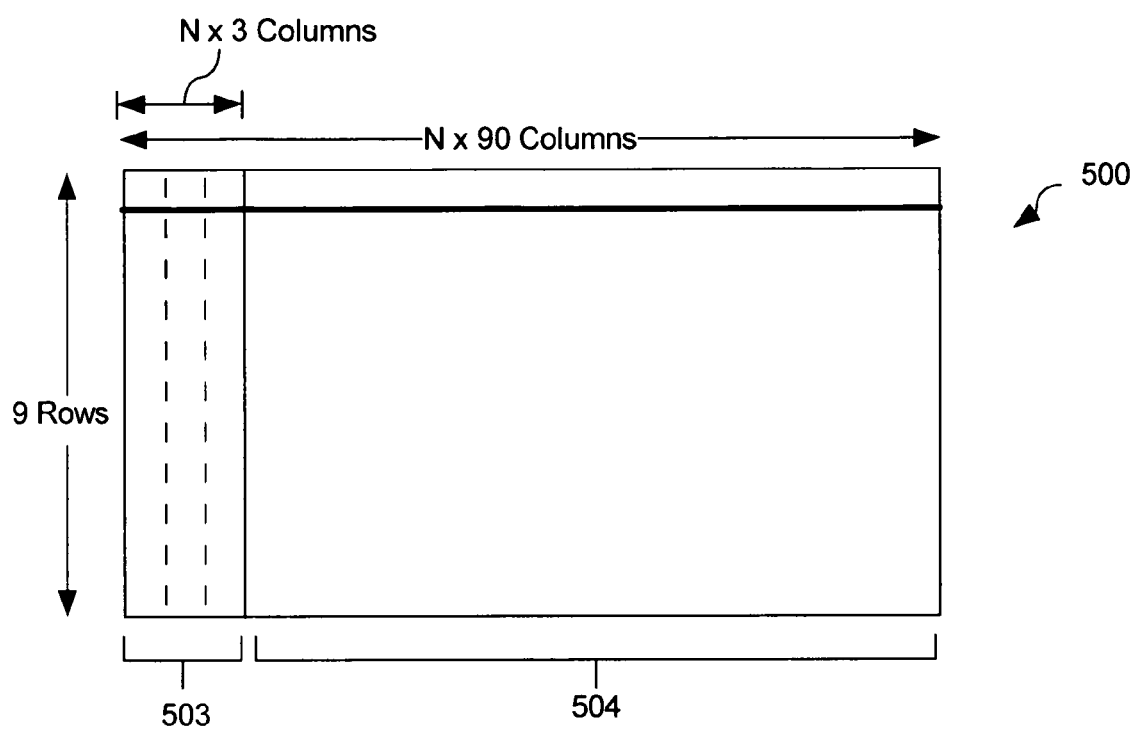
FIG. 5 is a diagram that is useful for understanding an STS-N frame structure.

Referring now to FIG. 5, there is shown a diagram that is useful for understanding a STS-N frame structure. For higher data rate levels in the SONET hierarchy, STS-1 frames are byte interleaved to produce an STS-N frame 500. The STS-N frame 500 consists of 8 rows, and 90×N columns. In the STS-N frame, the columns that comprise the transport overhead area 202 are aligned with the STS-N frame. Additional details concerning the SONET standard for optical telecommunications transport are contained in a specification formulated by the Alliance for Telecom Industry Solutions (ATIS), the entirety of which standard is incorporated herein by reference.

Notably, many of the bytes contained in the section overhead area 206 and the line overhead area 208 are only defined for the first STS-1 in a frame of an STS-n signal. More particularly, when a STS-N frame is constructed by multiplexing a number of STS-1 frames together, many of the transport overhead bytes that are defined for the first STS-1 in the STS-N frame format are not also defined for the following STS-1s in the third, fourth . . . and Nth position within the frame. This concept is best understood with reference to FIGS. 6, 7 and 8.

FIG. 6 is a table that identifies certain transport overhead bytes contained in section overhead area 206 and line overhead area 208. As can be observed from FIG. 6, there are a number of such bytes that are not defined for STS-1 #2 through STS-1 #N within a given STS-N frame. There are also a number of bytes that are undefined for STS-1 #49 through STS-1 #N. Since these bytes are undefined by the existing SONET standard, they can be potentially used for proprietary purposes. For example, the undefined bytes can be selectively used to form additional transport channels for network management and for other purposes.

Referring now to FIG. 7, there is shown a matrix representing a transport overhead portion of an STS-3 frame. Within the frame, it can be observed that selected bytes are undefined as previously described in relation to FIG. 6. Similarly, FIG. 8 is a matrix representing a portion of a transport overhead area of an STS-N frame that includes the transport overhead for the STS-1 frames in position number 4, 5 and 6 of the frame. Once again, it can be observed that there are a number of bytes that are undefined for STS-1 frames in these positions.

The present invention takes advantage of the foregoing bytes that are undefined in the transport overhead portion of the STS-1 frame. In this regard, the method can include selecting from the transport overhead area, at least one byte that is undefined by the SONET Telecommunication Standard for at least one STS-1 of an STS-N frame. Using this undefined byte or bytes, data can be communicated between a plurality of nodes 402, 404, 406 in the network using at least one data channel formed of the at least one byte that is undefined. Notably, undefined bytes for this purpose can be selected from the section overhead area 206 or from the line overhead area 208.

Figure 9:
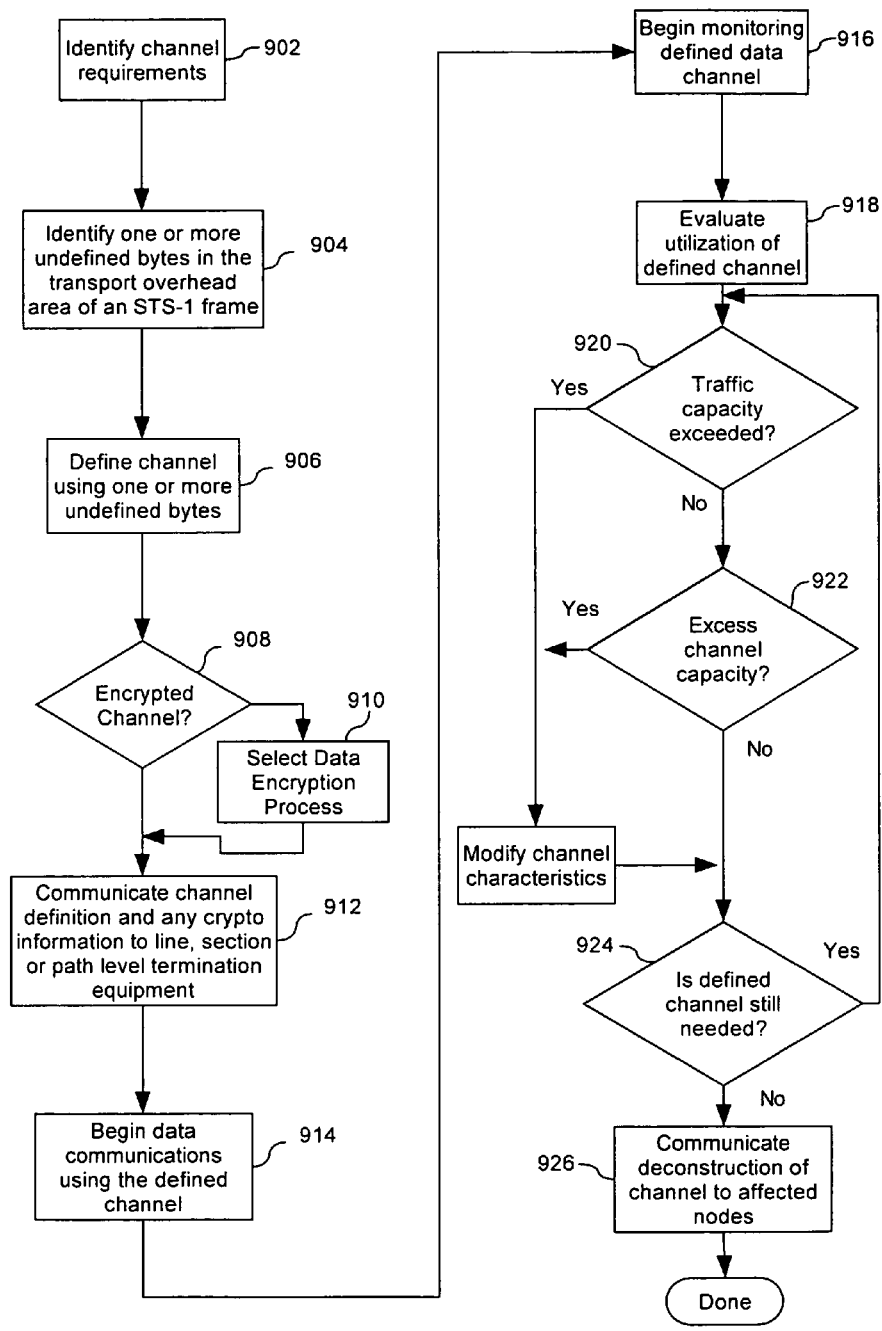
FIG. 9 is a flowchart that is useful for understanding the present invention.

Referring now to FIG. 9, there is shown a flowchart that is useful for understanding the foregoing process. The process can begin in step 902 with the identification of channel requirements. The requirements of the channel can include the data rate, encryption requirements, and any other relevant parameters. The requirements can be determined automatically in response to a need for transmitting data, or can be defined by a user. In any case, once the channel requirements have been identified, then the process can continue on to step 904.

In step 904, one or more undefined bytes can be identified in the transport overhead area of an STS-1 frame. For example, the undefined bytes can be selected from those listed in FIGS. 6-9. Once the available undefined bytes have been determined, a data channel can be defined in step 906 by specifying the bytes that are to be used for data transport. In step 908, the process can continue by checking to determine if the channel requirements specify that the channel is to be encrypted. If so, then the process continues on to step 910 where the data encryption process for the channel can be selected. For example, if two or more channels are used, then one defined channel can have a Classified security level and a second defined channel can be a Secret security level. Each channel can be separately encrypted so as to meet the differing encryption requirements of the multiple security levels.

Any necessary encryption keys can also be determined at this step. Once the channel has been fully defined in the foregoing manner, the channel definition and any associated cryptographic information can be communicated in step 912 to the line, section or path termination equipment that will be utilizing the data channel. Once all of the nodes have been alerted to the existence and parameters associated with the new data channel, the process can continue on to step 914. In step 914, data communications can begin among the network nodes using the channel. Those skilled in the art will appreciate that data communications over the defined channel can occur among the path termination, line termination, and section termination equipment described in FIG. 4. In addition, communications over the defined channel can occur between a network operation center server node and one or more nodes on the SONET defined network. The defined communication channel can be used for any suitable data transmission purpose associated with the operation of a SONET network including control, monitoring, administration, signaling, and other communication needs.

Once communications have commenced using the defined data channel, it can be desirable to monitor the status of the defined data channel I step 916. This monitoring process can include an evaluation of the bandwidth utilization for the channel in step 918. Thereafter, in step 920 if the available traffic capacity provided by the defined channel is exceeded, the process can include the step of automatically modifying the channel characteristics. Likewise, in step 922, if the results of the evaluation step 918 indicate that channel capacity is consistently underutilized, the channel characteristics can also be modified. These channel characteristics can include the location of the channel byte or bytes that are used to form the channel within the transport overhead area 202 and the bandwidth of the data channel. For example, more or fewer undefined bytes can be used for the data channel as needed.

It will be appreciated from the foregoing description that the method can include dynamically selecting the byte or bytes from the transport overhead area 202 to form a dynamically configurable data channel. For example, the dynamically selection can include dynamically modifying one or more data channel characteristics. The channel can also be dynamically formed and dynamically deconstructed as the need for such a traffic channel arises in the course of network operations. Thus, in step 924, the process can determine whether a particular data channel is still needed. This information can generally be determined on the basis of a user input. However, if the channel is unused for long periods, that can also serve as an automatic indication that the channel is no longer needed. In any case, if the channel is determined in step 924 to be no longer needed, then it can be deconstructed in step 926.

Data that is communicated over the data channel data formed from the undefined bytes can be selected so that is exclusively of a single data type. For example, and without limitation, the data type can be network management data, or network control and signaling data. Advantageously, one or more data channels can be formed using the present invention.

It will be appreciated that the foregoing process can be used to communicate data having a first defined security level on a first one of the defined data channels, and to communicate data having a second defined security level on at least a second one of the defined data channels. The first and second defined security levels can be different from one another. For example, one security level can be a classified security level, a second defined security level can be a secret level and a third defined security level can be a top secret level. The various security levels can be encrypted to varying degrees as appropriate.

Referring now to FIG. 10, there is shown a block diagram showing one possible arrangement for implementing the inventive concepts within a SONET based network. In FIG. 10, the selection of channel definitions and requirements can be provided by a user by means of a channel planning tool 1002. The channel planning tool 1002 can be a software application executing on a programmable computer. The channel planning tool can communicate with a network management server 1004. A plurality of network management applications can be installed and execute on the network management server 1004. For example, these can include configuration management software application 1008, fault management software application 1010, performance management application 1012, and security management application 1014. Examples of such network management applications include the NetBoss EM element management system (EMS) that supports distributed network architectures. It has the flexibility to support a wide range of network topologies and network element protocols, and provides the ability to model networks and monitor their components in real time.

The target network element 1006 can be any element of the SONET network. For example, the target network element 1006 can be a path termination element 402, a section termination element 404, or a line termination element 406. Examples of the section termination element 404 can include a regenerator. Examples of the line termination element 406 can include an add/drop multiplexer or a digital cross-connect system. Typically, the target network element 1006 receives a SONET optical carrier signal and converts that optical signal to an intermediate frequency (IF). In this regard, the target network element 1006 can also include a SONET IF subsystem 1016 and a SONET chipset for decoding the SONET signal. Advantageously, the SONET chipset can be a third generation chipset that provides access to the undefined overhead bytes described herein. Third generation SONET chipsets are commercially available from various manufacturers. Some SONET chipsets may provide sufficient flexibility to define additional data channels as described herein. Alternatively, target network element 1006 can optionally include a separate channelizer 1020. The channelizer can be a microprocessor or ASIC device that is responsive to control signals from the network management server to assemble selected bytes from the transport overhead area 202 to define any channels as described herein.

As noted above, one or more channels may be constructed using the undefined bytes from the transport overhead area of the STS-1 frames. These are designated as CH1 through CH6 in FIG. 10. Advantageously, the additional channels formed using the present invention can be segregated in terms of the nature of the data that is transmitted. Thus, CH1 can be used for unclassified network management data, CH2 can be used for unclassified network control and signaling data, CH3 can be used for Secret level network management data, CH4 can be used for Secret level network control and signaling data, CH5 can be used for top Secret level network management data, and CH can be used for top secret level network control and signaling data. In FIG. 10, cryptographic processors 1022-3 through 1022-6 are provided on CH3 through CH6 for preventing unauthorized access to secure data.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

A number of references are cited herein, the entire disclosures of which are incorporated herein, in their entirety, by reference for all purposes. Further, none of these references, regardless of how characterized above, is admitted as prior to the invention of the subject matter claimed herein.

We claim:

1. A method for managing a network including at least one programmable computer communicatively coupled to a plurality of nodes via a network management server, said network operating in accordance with a SONET Telecommunications Standard that defines a set of synchronous transport signals (STSs), where each STS is divided into two main areas including a transport overhead area that has a section overhead area and a line overhead area, and a synchronous payload envelope (SPE) area for the transmission of data, comprising:
   selecting from said transport overhead area at least two bytes that are undefined by said SONET Telecommunication Standard for at least one STS-1 of an STS-n frame, where said at least two bytes are selected by a user of said programmable computer or automatically by said programmable computer;
   exclusively communicating first data between said plurality of nodes in said network using a first data channel formed of a first byte of said at least two bytes that are undefined, said first data encrypted using a first data encryption process that meets encryption requirements of a first defined security level;
   exclusively communicating second data between said plurality of nodes in said network using a second data channel formed of a second byte of said at least two bytes that are undefined, said second data encrypted using a second data encryption process that meets encryption requirements of a second defined security level different from said first defined security level;
   determining at said network management server whether an available traffic capacity provided by said first or second data channel is exceeded or whether a channel capacity is underutilized; and
   performing automatic modification operations at said network management server to automatically modify a channel characteristic of said first or second data channel if it is determined that said available traffic capacity is exceeded or said channel capacity is underutilized;
   wherein said channel characteristic includes at least one of a location of said at least one byte used to form said first or second data channel within said transport overhead area and a number of bytes comprising said first or second data channel.

2. The method according to claim 1, further comprising performing operations at said programmable computer to dynamically form or dynamically deconstruct at least one of said first and second data channels.

3. The method according to claim 1, wherein each of said first data and said second data is exclusively of a single type selected from the group consisting of (1) network management data and (2) network control and signaling data.

4. The method according to claim 1, further comprising communicating third data having a third defined security level between said plurality of nodes using a third data channel formed within said transport overhead area, said third defined security level being different from said first and second defined security levels.

5. The method according to claim 4, further comprising encrypting at said plurality of nodes said third data using a third data encryption process that meets encryption requirements of said third defined security level.

6. The method according to claim 1, further comprising monitoring said network to identify when a change to a quantity or a capacity of at least one data channel of said first and second data channels is needed, where said network is monitored by one or more of said plurality of nodes.

7. The method according to claim 6, further comprising changing said quantity or said capacity of said at least one data channel automatically in response to said monitoring step, where said quantity or said capacity is changed by said network management server.

8. The method according to claim 1, further comprising selecting a byte of said at least two bytes from the section overhead area, where said byte is selected by a user of said programmable computer or automatically by said programmable computer.

9. The method according to claim 1, further comprising selecting a byte of said at least two bytes from the line overhead area, where said byte is selected by a user of said programmable computer or automatically by said programmable computer.

10. A method for managing a network including at least one programmable computer communicatively coupled to a plurality of nodes, said network operating in accordance with a SONET Telecommunications Standard that defines a set of synchronous transport signals (STSs), where each STS is divided into two main areas including a transport overhead area that has a section overhead area and a line overhead area, and a synchronous payload envelope (SPE) area for the transmission of data, comprising:
   identifying from said transport overhead area a plurality of bytes that are undefined by said SONET Telecommunication Standard for at least one STS-1 of an STS-n frame, where said plurality of bytes are identified by a user of said programmable computer or automatically by said programmable computer;
   defining at least two data channels by specifying at least two bytes of said plurality of bytes that are to be used for data transport, where said data channels are defined by said user of said programmable computer or automatically by said programmable computer;
   communicating data between a plurality of nodes in said network using said data channels, said data communicated on said data channels selected from the group consisting of (1) network management data, and (2) network control and signaling data;
   exclusively communicating first data having a first defined security level between said plurality of nodes using a first one of said data channels, said first data encrypted using a first data encryption process that meets encryption requirements of said first defined security level;
   communicating second data having a second defined security level, different from said first defined security level, between said plurality of nodes using at least a second one of said data channels, said second data encrypted using a second data encryption process, different from said first data encryption process, that meets encryption requirements of said second defined security level;

determining at said network management server whether an available traffic capacity provided by said first one of said data channels is exceeded or whether a channel capacity is underutilized; and performing automatic modification operations at said network management server to automatically modify a channel characteristic of said first one of said data channels if it is determined that said available traffic capacity is exceeded or said channel capacity is underutilized;

wherein said channel characteristic includes at least one of a location of said byte used to form said first one of said data channels within said transport overhead area and a number of bytes comprising said first one of said data channels.

11. The method according to claim 10, further comprising dynamically selecting one of said at least two bytes to form at least one dynamically configurable data channel, where said byte is dynamically selected by a user of said programmable computer or automatically by said programmable computer.

12. The method according to claim 10, further comprising performing operations at said programmable computer to dynamically construct and dynamically deconstruct at least one of said data channels.

13. The method according to claim 10, further comprising the step of decrypting at said plurality of nodes said first or second data transported on at least one of said data channels.

14. The method according to claim 10, further comprising monitoring said network to identify when changes to a number of said data channels or a capacity of said data channels is needed, where said network is monitored by one or more of said plurality of nodes.

15. The method according to claim 14, further comprising changing said number of said data channels or said capacity of said data channels automatically in response to said monitoring step, where said quantity or said capacity is changed by said network management server.

16. The method according to claim 10, further comprising selecting said at least two bytes from the section overhead area, where said at least two bytes are selected by a user of said programmable computer or automatically by said programmable computer.

17. The method according to claim 10, further comprising selecting said at least two bytes from the line overhead area, where said at least two bytes are selected by a user of said programmable computer or automatically by said programmable computer.

* * * * *